US011522185B2

United States Patent
Ha et al.

(10) Patent No.: US 11,522,185 B2
(45) Date of Patent: Dec. 6, 2022

(54) RECHARGEABLE LITHIUM BATTERY

(71) Applicant: Samsung SDI Co., Ltd., Yongin-si (KR)

(72) Inventors: Jaehwan Ha, Yongin-si (KR); Kijun Kim, Yongin-si (KR); Heeeun Yoo, Yongin-si (KR); Yeonhee Yoon, Yongin-si (KR); Kyuseo Lee, Yongin-si (KR); Dongmyung Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 230 days.

(21) Appl. No.: 16/862,638

(22) Filed: Apr. 30, 2020

(65) Prior Publication Data

US 2020/0350580 A1 Nov. 5, 2020

(30) Foreign Application Priority Data

May 3, 2019 (KR) ........................ 10-2019-0052573

(51) Int. Cl.
*H01M 4/525* (2010.01)
*H01M 4/505* (2010.01)
(Continued)

(52) U.S. Cl.
CPC .......... *H01M 4/525* (2013.01); *H01M 4/505* (2013.01); *H01M 4/606* (2013.01); *H01M 4/621* (2013.01);
(Continued)

(58) Field of Classification Search
CPC ...... H01M 4/505; H01M 4/525; H01M 4/606; H01M 4/621
(Continued)

(56) References Cited

U.S. PATENT DOCUMENTS

| 5,582,931 A | 12/1996 | Kawakami |
| 6,391,495 B1 | 5/2002 | Choi et al. |

(Continued)

FOREIGN PATENT DOCUMENTS

| CN | 1246736 | 3/2000 |
| CN | 1286507 | 3/2001 |

(Continued)

OTHER PUBLICATIONS

Office Action dated Nov. 9, 2021, issued to European Patent Application No. 19183919.0.

(Continued)

*Primary Examiner* — James M Erwin
(74) *Attorney, Agent, or Firm* — H.C. Park & Associates, PLC

(57) ABSTRACT

A rechargeable lithium battery includes a positive electrode including a positive current collector and a positive active material layer disposed on the positive current collector; and a negative electrode including a negative current collector, a negative active material layer disposed on the negative current collector, and a negative electrode functional layer disposed on the negative active material layer, wherein the positive active material layer includes a first positive active material including at least one of a composite oxide of metal selected from cobalt, manganese, nickel, and a combination thereof and lithium and a second positive active material including at least one of compounds represented by Chemical Formula 1 to Chemical Formula 4, and the negative electrode functional layer includes flake-shaped polyethylene particles and $Li_{x2}Mn_{1-y2}M'_{y2}A_2$ [Chemical Formula 1]

$Li_{x2}Mn_{1-y2}M'_{y}O_{2-z2}X_{z2}$ [Chemical Formula 2]

(Continued)

$Li_{x2}Mn_2O_{4-z2}X_{z2}$ [Chemical Formula 3]

$Li_{x2}Mn_{2-y2}M'_{y2}M''_{z2}A_4$ [Chemical Formula 4]

wherein, $0.9 \leq x2 \leq 1.1$, $0 \leq y2 \leq 0.5$, $0 \leq z2 \leq 0.5$, M' and M" are the same or different and are selected from Mg, Al, Co, K, Na, Ca, Si, Ti, Sn, V, Ge, Ga, B, As, Zr, Mn, Cr, Fe, Sr, V, and a rare earth element, and wherein A is selected from O, F, S, and P and X is selected from F, S, and P.

17 Claims, 4 Drawing Sheets

(51) Int. Cl.
  *H01M 4/60* (2006.01)
  *H01M 4/62* (2006.01)
  *H01M 4/02* (2006.01)
(52) U.S. Cl.
  CPC ............ *H01M 2004/021* (2013.01); *H01M 2004/027* (2013.01); *H01M 2004/028* (2013.01)
(58) Field of Classification Search
  USPC .......................................................... 429/209
  See application file for complete search history.

(56) References Cited

U.S. PATENT DOCUMENTS

| | | | |
|---|---|---|---|
| 6,465,125 B1 | 10/2002 | Takami et al. | |
| 6,475,678 B1 | 11/2002 | Isao | |
| 6,511,517 B1 | 1/2003 | Ullrich et al. | |
| 6,511,776 B1 | 1/2003 | Ryuji et al. | |
| 10,476,082 B2 | 11/2019 | Jang et al. | |
| 10,756,352 B2 | 8/2020 | Yoon et al. | |
| 2001/0041289 A1 | 11/2001 | Hikmet et al. | |
| 2002/0004169 A1 | 1/2002 | Yamada et al. | |
| 2005/0079422 A1 | 4/2005 | Ko et al. | |
| 2005/0221165 A1 | 10/2005 | Hennige et al. | |
| 2005/0287442 A1 | 12/2005 | Kim et al. | |
| 2006/0099495 A1 | 5/2006 | Suzuki et al. | |
| 2007/0057228 A1 | 3/2007 | Huang et al. | |
| 2007/0264577 A1 | 11/2007 | Katayama et al. | |
| 2008/0241864 A1 | 10/2008 | Muraoka et al. | |
| 2008/0292965 A1 | 11/2008 | Kubota et al. | |
| 2009/0067119 A1 | 3/2009 | Katayama et al. | |
| 2009/0253043 A1 | 10/2009 | Bak | |
| 2010/0248026 A1 | 9/2010 | Hinoki et al. | |
| 2010/0266905 A1 | 10/2010 | Jeon et al. | |
| 2011/0003209 A1 | 1/2011 | Katayama et al. | |
| 2011/0062378 A1 | 3/2011 | Chang et al. | |
| 2012/0321948 A1 | 12/2012 | Oya et al. | |
| 2013/0011747 A1 | 1/2013 | Sasaki et al. | |
| 2013/0089794 A1 | 4/2013 | Kim et al. | |
| 2013/0236790 A1 | 9/2013 | Byun | |
| 2013/0288093 A1 | 10/2013 | Nakagiri et al. | |
| 2013/0335030 A1 | 12/2013 | Joe et al. | |
| 2013/0337301 A1 | 12/2013 | Joe et al. | |
| 2013/0346000 A1 | 12/2013 | Joe et al. | |
| 2014/0014027 A1 | 1/2014 | Bischoff et al. | |
| 2014/0138591 A1 | 5/2014 | Yoon et al. | |
| 2014/0272489 A1 | 9/2014 | Anandan et al. | |
| 2014/0322600 A1 | 10/2014 | Morita et al. | |
| 2015/0050533 A1 | 2/2015 | Nam et al. | |
| 2015/0221452 A1 | 8/2015 | Iida et al. | |
| 2016/0104880 A1 | 4/2016 | Gao et al. | |
| 2016/0141579 A1 | 5/2016 | Seok et al. | |
| 2016/0268558 A1 | 9/2016 | Sawayama et al. | |
| 2016/0285101 A1 | 9/2016 | Yoshio et al. | |
| 2016/0322636 A1 | 11/2016 | Lee et al. | |
| 2016/0351885 A1 | 12/2016 | Umehara | |
| 2017/0187022 A1 | 6/2017 | Isozaki et al. | |
| 2017/0229731 A1 | 8/2017 | Visco et al. | |
| 2017/0288257 A1 | 10/2017 | Kil et al. | |
| 2018/0040899 A1 | 2/2018 | Kuzuoka et al. | |
| 2018/0083312 A1 | 3/2018 | Shiu et al. | |
| 2018/0097218 A1 | 4/2018 | Komura | |
| 2018/0145333 A1 | 5/2018 | Tokune et al. | |
| 2018/0191027 A1 | 7/2018 | Ohara et al. | |
| 2018/0294516 A1 | 10/2018 | Huang et al. | |
| 2018/0331342 A1 | 11/2018 | Honda et al. | |
| 2018/0375158 A1 | 12/2018 | Morinaka et al. | |
| 2019/0123352 A1 | 4/2019 | Ko et al. | |
| 2019/0123356 A1 | 4/2019 | Ko et al. | |
| 2019/0140283 A1 | 5/2019 | Fukatani et al. | |
| 2019/0229325 A1 | 7/2019 | Ahn et al. | |
| 2019/0334157 A1 | 10/2019 | Seok et al. | |
| 2019/0355952 A1 | 11/2019 | Yoon et al. | |
| 2019/0383465 A1 | 12/2019 | Van Der et al. | |
| 2020/0014027 A1 | 1/2020 | Ha et al. | |
| 2020/0014078 A1 | 1/2020 | Ha et al. | |
| 2020/0075955 A1 | 3/2020 | Jeon et al. | |
| 2020/0127257 A1 | 4/2020 | Lee et al. | |
| 2020/0194784 A1 | 6/2020 | Lee et al. | |
| 2020/0350557 A1 | 11/2020 | Ha et al. | |
| 2020/0350566 A1 | 11/2020 | Ha et al. | |
| 2020/0350567 A1 | 11/2020 | Ha et al. | |
| 2020/0350568 A1 | 11/2020 | Lee et al. | |
| 2020/0350574 A1 | 11/2020 | Ha et al. | |
| 2020/0350632 A1 | 11/2020 | Ha et al. | |
| 2021/0074967 A1 | 3/2021 | Kim et al. | |
| 2021/0074971 A1 | 3/2021 | Kim et al. | |
| 2021/0074972 A1 | 3/2021 | Kim et al. | |
| 2021/0074975 A1 | 3/2021 | Kwak et al. | |
| 2021/0074979 A1 | 3/2021 | Kwak et al. | |
| 2021/0074980 A1 | 3/2021 | Kim et al. | |

FOREIGN PATENT DOCUMENTS

| | | |
|---|---|---|
| CN | 101048892 | 10/2007 |
| CN | 101783417 | 7/2010 |
| CN | 101847709 | 9/2010 |
| CN | 101478042 | 12/2010 |
| CN | 102280614 | 12/2011 |
| CN | 104393267 | 3/2015 |
| CN | 104466186 | 3/2015 |
| CN | 105977447 | 9/2016 |
| CN | 106848383 | 6/2017 |
| CN | 111883815 | 11/2020 |
| CN | 111883816 | 11/2020 |
| CN | 111883819 | 11/2020 |
| EP | 1079455 | 2/2001 |
| EP | 1826842 | 8/2007 |
| EP | 2581977 | 4/2013 |
| EP | 2838142 | 2/2015 |
| EP | 2874215 | 5/2015 |
| EP | 3024083 | 5/2016 |
| EP | 3386003 | 10/2018 |
| JP | 2000-277148 | 10/2000 |
| JP | 2001-135359 | 5/2001 |
| JP | 2004-111157 | 4/2004 |
| JP | 2005-123185 | 5/2005 |
| JP | 2008-305783 | 12/2008 |
| JP | 4977079 | 7/2012 |
| JP | 2012-221672 | 11/2012 |
| JP | 5110670 | 7/2014 |
| JP | 2015-115168 | 6/2015 |
| JP | 6197384 | 9/2017 |
| JP | 6271709 | 1/2018 |
| JP | 2018-106879 | 7/2018 |
| JP | 2018-147672 | 9/2018 |
| JP | 2018-156876 | 10/2018 |
| JP | 2018156876 | 10/2018 |
| JP | 2019-087464 | 6/2019 |
| KR | 10-2000-0056339 | 9/2000 |
| KR | 10-2005-0035074 | 4/2005 |
| KR | 10-2005-0035281 | 4/2005 |
| KR | 10-2005-0121172 | 12/2005 |
| KR | 10-2008-0073371 | 8/2008 |
| KR | 10-1205375 | 3/2009 |
| KR | 10-2009-0106841 | 10/2009 |
| KR | 10-2010-0081950 | 7/2010 |
| KR | 10-2013-0104088 | 9/2013 |

(56) References Cited

FOREIGN PATENT DOCUMENTS

| KR | 10-2013-0105449 | 9/2013 |
|---|---|---|
| KR | 10-2013-0116170 | 10/2013 |
| KR | 10-2014-0068893 | 6/2014 |
| KR | 10-2015-0020022 | 2/2015 |
| KR | 10-2015-0050974 | 5/2015 |
| KR | 10-2015-0129181 | 11/2015 |
| KR | 10-2015-0143334 | 12/2015 |
| KR | 10-2016-0024776 | 3/2016 |
| KR | 10-2016-0025052 | 3/2016 |
| KR | 10-2016-0029176 | 3/2016 |
| KR | 10-2016-0066518 | 6/2016 |
| KR | 10-2016-0110076 | 9/2016 |
| KR | 10-2016-0117689 | 10/2016 |
| KR | 10-2017-0060515 | 6/2017 |
| KR | 10-2017-0094720 | 8/2017 |
| KR | 10-2017-0109285 | 9/2017 |
| KR | 10-2017-0113645 | 10/2017 |
| KR | 10-2018-0014192 | 2/2018 |
| KR | 10-2018-0037121 | 4/2018 |
| KR | 10-2018-0045724 | 5/2018 |
| KR | 10-2018-0049986 | 5/2018 |
| KR | 10-2018-0077190 | 7/2018 |
| KR | 10-2018-0081072 | 7/2018 |
| KR | 10-1876826 | 7/2018 |
| KR | 10-2018-0097036 | 8/2018 |
| KR | 10-2019-0043955 | 4/2019 |
| KR | 10-2019-0043957 | 4/2019 |
| KR | 10-2020-0004099 | 1/2020 |
| KR | 10-2020-0044579 | 4/2020 |
| WO | 2006-132474 | 12/2006 |
| WO | 2011115247 | 7/2013 |
| WO | 2014-103792 | 7/2014 |
| WO | 2018-012821 | 1/2018 |

OTHER PUBLICATIONS

Notice of Refusal dated Mar. 11, 2021, issued to Korean Patent Application No. 10-2018-0160080.
Grant of Patent dated Mar. 25, 2021, issued to Korean Patent Application No. 10-2018-0077138.
Grant of Patent dated Mar. 25, 2021, issued to Korean Patent Application No. 10-2018-0077139.
Office Action dated Apr. 12, 2021, issued to U.S. Appl. No. 16/460,779.
Notice of Allowance dated Sep. 2, 2021, issued to Korean Patent Application No. 10-2018-0160080.
Office Action dated Sep. 10, 2021, issued to U.S. Appl. No. 16/460,765.
Office Action dated Sep. 10, 2021, issued to U.S. Appl. No. 16/711,114.
Advisory Action and AFCP Decision dated Jan. 6, 2022 issued to U.S. Appl. No. 16/460,779.
Office Action dated Jan. 26, 2022 and Search Reported dated Jan. 21, 2022, issued to Chinese Patent Application No. 201901595050.
Extended European Search Report dated Nov. 7, 2019 to European Patent Application No. 19183919.0.
Extended European Search Report dated Nov. 7, 2019 to European Patent Application No. 19183958.8.
Office Action dated Mar. 4, 2021, issued to U.S. Appl. No. 16/460,765.
Office Action and Search Report dated Feb. 9, 2022, issued to Chinese Patent Application No. 201910594666.
Office Action dated Feb. 17, 2022, issued to U.S. Appl. No. 16/862,779.
Office Action dated Feb. 17, 2022, issued to U.S. Appl. No. 16/460,765.
Non-Final Office Action dated Mar. 28, 2022, issued to U.S. Appl. No. 16/863,679.
Final Office Action dated Dec. 15, 2021, issued to U.S. Appl. No. 16/711,114.
Notice of Allowance dated Mar. 2, 2022, issued to U.S. Appl. No. 16/711,114.
Final Office Action dated Oct. 22, 2021, issued to U.S. Appl. No. 16/460,779.
Advisory Action dated Nov. 17, 2021, issued to U.S. Appl. No. 16/460,765.
Non-Final Office Action dated Apr. 1, 2022, issued to U.S. Appl. No. 16/864,384.
Extended European Search Report dated Aug. 3, 2020, issued to European Patent Application No. 20171859.0.
Extended European Search Report dated Aug. 3, 2020, issued to European Patent Application No. 20171551.3.
Extended European Search Report dated Aug. 3, 2020, issued to European Patent Application No. 20171450.8.
Extended European Search Report dated Aug. 3, 2020, issued to European Patent Application No. 20171833.5.
Extended European Search Report dated Aug. 3, 2020, issued to European Patent Application No. 20171846.7.
Extended European Search Report dated Aug. 3, 2020, issued to European Patent Application No. 20172132.1.
Extended European Search Report dated Oct. 19, 2020, issued to European Patent Application No. 20172161.
Non-Final Office Action dated Jun. 28, 2022, issued to U.S. Appl. No. 16/864,858.
Final Office Action dated Jun. 7, 2022, issued to U.S. Appl. No. 16/862,779.
Non-Final Office Action dated May 3, 2022, issued to U.S. Appl. No. 16/864,294.
Non-Final Office Action dated May 12, 2022, issued to U.S. Appl. No. 16/862,866.
Jing Wang, et al., "Thermal Synergy Effect between $LiNi_{0.5}Co_{0.2}Mn_{0.3}O_2$ and $LiMn_2O_4$ Enhances the Safety of Blended Cathode for Lithium Ion Batteries", ACS Appl. Mater. Interfaces 2016, 8, pp. 20147-20156 (Jul. 22, 2016).
Notice of Allowance dated Jul. 11, 2022, of Korean Patent Application No. 10-2019-0052572.
Notice of Allowance dated Jul. 11, 2022, of Korean Patent Application No. 10-2019-0052574.
Office Action dated Jul. 13, 2022, of Korean Patent Application No. 10-2019-0052571.
Notice of Allowance dated Jul. 13, 2022, of Korean Patent Application No. 10-2019-0052570.
Office Action dated Jul. 13, 2022, of Korean Patent Application No. 10-2019-0052573.
Notice of Allowance dated Jul. 13, 2022, of U.S. Appl. No. 16/460,779.
Office Action dated Jul. 22, 2022, of European Patent Application No. 20172161.0.
Notice of Allowance dated Jul. 20, 2022, of U.S. Appl. No. 16/863,679.
Notice of Allowance dated Aug. 1, 2022, of U.S. Appl. No. 16/864,384.
Office Action dated Aug. 23, 2022, of Chinese.Patent Application No. 201911266005.8.
Final Office Action dated Aug. 30, 2022, issued to U.S. Appl. No. 16/864,294.
Notice of Allowance dated Aug. 15, 2022, issued to U.S. Appl. No. 16/862,779.
Final Office Action dated Sep. 23, 2022, issued to U.S. Appl. No. 16/460,765.
Notice of Allowance dated Oct. 5, 2022, issued to Korean Patent Application No. 10-2019-0052569.
Notice of Allowance dated Oct. 5, 2022, issued to Korean Patent Application No. 10-2019-0052568.

RECHARGEABLE LITHIUM BATTERY

CROSS REFERENCE TO RELATED APPLICATION

This application claims priority to and the benefit of Korean Patent Application No. 10-2019-0052573, filed on May 3, 2019, which is hereby incorporated by reference for all purposes as if fully set forth herein. Further, two related co-pending applications were filed on Jul. 2, 2019 with United States Patent and Trademark Office, as U.S. patent application Ser. No. 16/460,765 and U.S. patent application Ser. No. 16/460,779, both of which are hereby incorporated by reference for all purposes as if fully set forth herein, but are not admitted to be prior art with respect to the present invention by their mention in the cross-reference section.

BACKGROUND OF THE INVENTION

Field

Exemplary embodiments/implementations of the invention relate generally to rechargeable lithium battery.

Discussion of the Background

A portable information device such as a cell phone, a laptop, smart phone, and the like or an electric vehicle has used a rechargeable lithium battery having high energy density and easy portability as a driving power source. In addition, research on use of a rechargeable lithium battery as a power source for a hybrid or electric vehicle or a power storage by using high energy density characteristics has recently been actively made.

One of the main research tasks of such a rechargeable lithium battery is to improve the safety of the rechargeable battery. For example, if the rechargeable lithium battery exothermic due to internal short circuit, overcharge and over-discharge, and the like, an electrolyte decomposition and thermal runaway may occur, and internal pressure inside the battery may rapidly rise causing battery explosion. Among these, when internal short circuit of the rechargeable lithium battery occurs, there is a high risk of explosion because high electrical energy stored in each electrode is conducted through the shorted positive electrode and negative electrode.

Explosion may cause fatal damages to the user. Therefore, it is important to develop a technology to improve the rechargeable lithium battery safety.

On the other hand, lithium iron phosphate (LFP) is used as a low heat-generating safety material, but an average potential thereof is relatively low, accompanied by a decrease in capacity when discharging. Therefore, there is a need for technology development to improve these problems.

The above information disclosed in this Background section is only for understanding of the background of the inventive concepts, and, therefore, it may contain information that does not constitute prior art.

SUMMARY

Devices constructed/methods according to exemplary implementations embodiments of the invention are rechargeable lithium battery capable of providing high capacity and high power.

According to one or more implementations/embodiments of the invention, a rechargeable lithium battery includes a positive electrode including a positive current collector and a positive active material layer disposed on the positive current collector; and a negative electrode including a negative current collector, a negative active material layer disposed on the negative current collector, and a negative electrode functional layer disposed on the negative active material layer, the positive active material layer includes a first positive active material including at least one of a composite oxide of metal selected from cobalt, manganese, nickel, and a combination thereof and lithium and a second positive active material including at least one of compounds represented by Chemical Formula 1 to Chemical Formula 4, and the negative electrode functional layer includes flake-shaped polyethylene particles.

$$Li_{x2}Mn_{1-y2}M'_{y2}A_2 \quad \text{[Chemical Formula 1]}$$

$$Li_{x2}Mn_{1-y2}M'_{y2}O_{2-z2}X_{z2} \quad \text{[Chemical Formula 2]}$$

$$Li_{x2}Mn_2O_{4-z2}X_{z2} \quad \text{[Chemical Formula 3]}$$

$$Li_{x2}Mn_{2-y2}M'_{y2}M''_{z2}A_4 \quad \text{[Chemical Formula 4]}$$

wherein $0.9 \leq x2 \leq 1.1$, $0 \leq y2 \leq 0.5$, $0 \leq z2 \leq 0.5$, M' and M'' are the same or different and are selected from Mg, Al, Co, K, Na, Ca, Si, Ti, Sn, V, Ge, Ga, B, As, Zr, Mn, Cr, Fe, Sr, V, and a rare earth element, and A is selected from O, F, S, and P and X is selected from F, S, and P.

As the reaction rate depending on a temperature is improved, an early shut-down function may be implemented, thereby enabling high capacity and high power characteristics of the rechargeable lithium battery.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
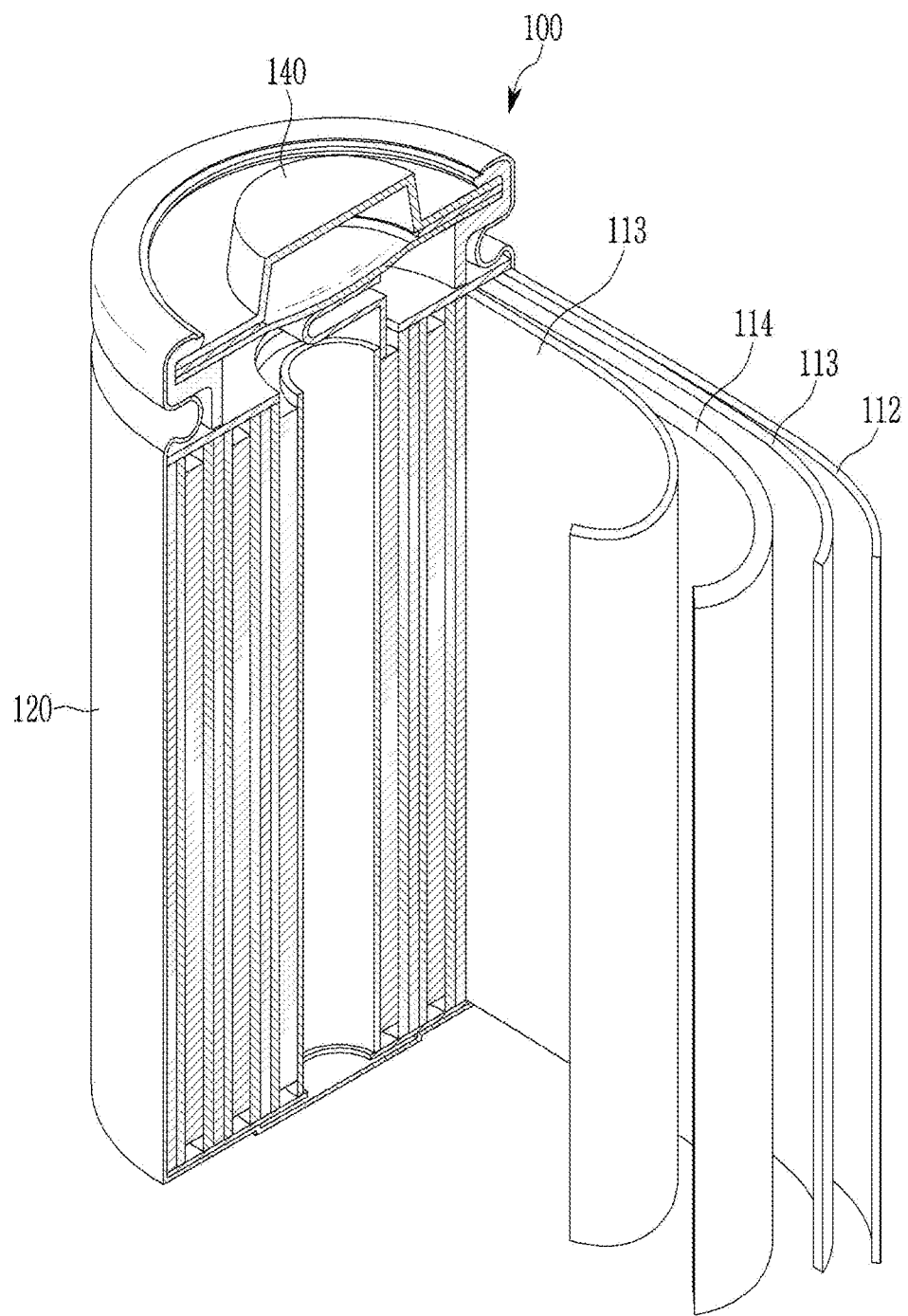
FIG. 1 schematically shows a structure of a rechargeable lithium battery according to an embodiment of the present disclosure.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, as an example of a rechargeable lithium battery, a cylindrical rechargeable lithium battery is for example described. FIG. 1 schematically shows a structure of a rechargeable lithium battery according to an embodiment. Referring to FIG. 1, a rechargeable lithium battery 100 according to an embodiment includes a battery cell including a positive electrode 114, a negative electrode 112 facing the positive electrode 114, a separator 113 disposed between the positive electrode 114 and the negative electrode 112, and an electrolyte (not shown) impregnating the positive electrode 114, negative electrode 112, and separator 113, a battery case 120 containing the battery cell, and a sealing member 140 sealing the battery case 120.

Hereinafter, a detailed configuration of the rechargeable lithium battery 100 according to an embodiment of the present invention is described.

A rechargeable lithium battery according to an embodiment includes a positive electrode and a negative electrode. The positive electrode includes a positive current collector and a positive active material layer disposed on the positive current collector. The negative electrode includes a negative current collector, a negative active material layer disposed on the negative current collector, and a negative electrode functional layer disposed on the negative active material layer.

The positive active material layer may include a first positive active material including at least one of a composite oxide of metal selected from cobalt, manganese, nickel, and a combination thereof and lithium. It may also include a second positive active material including at least one of compounds represented by Chemical Formula 1 to Chemical Formula 4. The negative electrode functional layer includes flake-shaped polyethylene particles.

The first positive active material may include a high capacity material having a high energy density per unit content, thereby realizing high capacity of the rechargeable lithium battery.

In addition, the second positive active material is a high power material having a high average potential and thus may improve capacity degradation at the high voltage discharge.

In other words, the first and second positive active materials are used together to realize a high-capacity and high power rechargeable lithium battery.

In addition, the negative electrode including the negative electrode functional layer including the flake-shaped polyethylene particles, may more effectively shut down ion channel and thus prevent an additional electrical/chemical reaction and thereby improve a rechargeable lithium battery safety.

The second positive active material has an average potential in a range of about 3.5 to 4.5 V. With average potential within such range, a rechargeable lithium battery may work at a high voltage, improving the capacity degradation problem, even at the increased discharge voltage, which may greatly improve cycle-life characteristics.

The first positive active material may be included in an amount of about 80 wt % to about 99 wt % and specifically, about 85 wt % to about 99 wt %, for example, about 85 wt % to about 97 wt % based on a total weight of the positive active material layer.

The second positive active material may be included in an amount of about 1 wt % to about 20 wt % and specifically, about 1 wt % to about 15 wt %, for example, about 3 wt % to about 15 wt % based on the total weight of the positive active material layer.

In a specific embodiment, the first and second positive active materials may be included in a weight ratio of about 85:15 to about 99:1 or about 85:15 to about 97:3, for example, about 85:15 to about 95:5, or about 85:15 to about 90:10.

When the first and second positive active materials satisfy the ranges, the safety may be improved without the capacity degradation.

In addition, the second positive active material is a low exothermic material and thus may lower an initial heat-increasing rate and secure safety.

The positive active material layer may further include a positive electrode functional layer disposed on the positive active material layer.

For example, the first positive active material may be included in the positive active material layer, and the second positive active material may be included in the positive electrode functional layer.

In this case, the first positive active material and the second positive active material may be included in a weight ratio of about 85:15 to about 99:1, for example, about 85:15 to about 97:3, or about 90:10 to about 97:3.

For example, the first positive active material may be included in the positive active material layer, and the second positive active material may be included in the positive active material layer and the positive electrode functional layer, respectively.

In this case, the first positive active material and the second positive active material may be included in a weight ratio of about 85:15 to about 99:1, for example, about 89:11 to about 99:1.

In this case, the second positive active material of the positive electrode functional layer may be included in an amount of about 20 parts by weight to about 120 parts by weight based on 100 parts by weight of the second positive active material of the positive active material layer.

The first positive active material may include one of $LiCoO_2$, $Li_{x1}M^1_{1-y1-z1}M^2_{y1}M^3_{z1}O_2$ ($0.9 \leq x1 \leq 1.8$, $0 \leq y1 \leq 1$, $0 \leq z1 \leq 1$, $0 \leq y1+z1 \leq 1$, and $M^1$, $M^2$, and $M^3$ are independently a metal of Ni, Co, Mn, Al, Sr, Mg, or La), and a combination thereof.

For example, the first positive active material may include $LiCoO_2$, but is not limited thereto.

For example, $M^1$ may be Ni, and $M^2$ and $M^3$ may independently be a metal such as Co, Mn, Al, Sr, Mg, or La.

More specifically, $M^1$ may be Ni, $M^2$ may be Co, and $M^3$ may be Mn or Al, but is are not limited thereto.

The second positive active material may be at least one of compounds represented by Chemical Formula 1 to Chemical Formula 4.

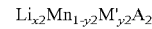  $Li_{x2}Mn_{1-y2}M'_{y2}A_2$                       [Chemical Formula 1]

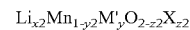  $Li_{x2}Mn_{1-y2}M'_yO_{2-z2}X_{z2}$             [Chemical Formula 2]

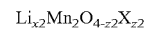  $Li_{x2}Mn_2O_{4-z2}X_{z2}$                        [Chemical Formula 3]

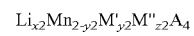  $Li_{x2}Mn_{2-y2}M'_{y2}M''_{z2}A_4$             [Chemical Formula 4]

wherein, $0.9 \leq x2 \leq 1.1$, $0 \leq y2 \leq 0.5$, $0 \leq z2 \leq 0.5$, M' and M'' are the same or different and are selected from Mg, Al, Co, K, Na, Ca, Si, Ti, Sn, V, Ge, Ga, B, As, Zr, Mn, Cr, Fe, Sr, V, and a rare earth element, and wherein A is selected from O, F, S, and P and X is selected from F, S, and P.

For example, the second positive active material may be $LiMn_2O_4$, but is not limited thereto.

The positive active material layer may optionally further include a positive electrode conductive material and a positive electrode binder.

The amounts of the positive electrode conductive material and the positive electrode binder may be about 1 wt % to about 5 wt % based on a total weight of the positive active material layer, respectively.

The positive electrode conductive material is used to impart conductivity to the positive electrode, and may be used as long as it is an electron conductive material without causing chemical change in the battery. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The positive electrode binder adheres positively to the positive active material particles, and also serves to adhere the positive active materials to the current collector well. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The positive current collector may include aluminum, nickel, and the like, but is not limited thereto.

The electrolyte includes a non-aqueous organic solvent and a lithium salt.

The non-aqueous organic solvent serves as a medium for transporting ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like and the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like and the ketone-based solvent may include cyclohexanone, and the like. The alcohol-based solvent include ethyl alcohol, isopropyl alcohol, and so on, and examples of the aprotic solvent include nitriles such as R—CN (wherein R is a C2 to C20 linear, branched, or cyclic hydrocarbon group that may include a double bond, an aromatic ring, or an ether bond), amides such as dimethylformamide, dioxolanes such as 1,3-dioxolane, sulfolanes, and so on.

The non-aqueous organic solvent may be used alone or in a mixture of two or more. When the organic solvent is used in a mixture, the mixture ratio can be controlled in accordance with a desirable battery performance.

The carbonate-based solvent may include a mixture of a cyclic carbonate and a chain carbonate. The cyclic carbonate and the chain carbonate are mixed together at a volume ratio of about 1:1 through about 1:9, and when the mixture is used as an electrolyte, the electrolyte performance may be enhanced.

The non-aqueous organic solvent of the present disclosure may further include an aromatic hydrocarbon-based organic solvent in addition to the carbonate-based solvent. In this case, the carbonate-based solvent and the aromatic hydrocarbon-based organic solvent may be mixed in a volume ratio of about 1:1 through about 30:1.

As the aromatic hydrocarbon-based organic solvent, an aromatic hydrocarbon-based compound of Chemical Formula 5 may be used.

[Chemical Formula 5]

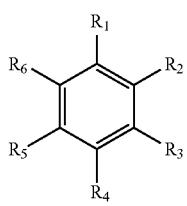

wherein $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate or an ethylene carbonate-based compound of Chemical Formula 6 in order to improve cycle-life of a battery.

[Chemical Formula 6]

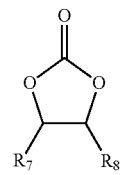

wherein $R_7$ and $R_8$ may be the same or different and may be selected from hydrogen, a halogen group, a cyano group (CN), a nitro group ($NO_2$), and a fluorinated C1 to C5 alkyl group, wherein at least one of $R_7$ and $R_8$ is selected from a halogen group, a cyano group (CN), a nitro group ($NO_2$), and a fluorinated C1 to C5 alkyl group, provided that $R_7$ and $R_8$ are not both hydrogen.

Examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the cycle-life improvement additive may be used within an appropriate range.

The lithium salt dissolved in an organic solvent supplies a battery with lithium ions, basically operates the rechargeable lithium battery, and improves transportation of the lithium ions between a positive electrode and a negative electrode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein x and y are natural numbers, LiCl, LiI, and $LiB(C_2O_4)_2$ (lithium bis(oxalato) borate, LiBOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

The polyethylene is generally HDPE (high density polyethylene, density: about 0.94 g/cc to about 0.965 g/cc), MDPE (medium density polyethylene, density: about 0.925 g/cc to about 0.94 g/cc), LDPE (low density polyethylene, density: about 0.91 g/cc to about 0.925 g/cc), VLDPE (very low density polyethylene, density: about 0.85 g/cc to about 0.91 g/cc), and the like.

The flake-shaped polyethylene particles may be used alone or in combination of two or more polyethylene polymers such as HDPE, MDPE, or LDPE.

The average particle size (D50) of the flake-shaped polyethylene particles included in the negative electrode functional layer disposed on the negative active material layer may be about 1 μm to about 8 μm, and specifically about 2 μm to about 6 μm.

As used herein, when a definition is not otherwise provided, the average particle size (D50) may be measured by a well-known method for a person of an ordinary skill in the art, for example, as a particle size analyzer, or from TEM or SEM photographs. Alternatively, a dynamic light-scattering measurement device is used to perform a data analysis, and the number of particles is counted for each particle size range. From this, the (D50) value may be easily obtained through a calculation.

On the other hand, a ratio of the long axis length relative to the short axis length of the flake-shaped polyethylene particles may be about 1 to about 5, specifically about 1.1 to about 4.5, for example about 1.2 to about 3.5.

In addition, a thickness of the flake-shaped polyethylene particles may be about 0.2 μm to about 4 μm, specifically, about 0.3 μm to about 2.5 μm, for example may be about 0.3 μm to about 1.5 μm.

Figure 3:
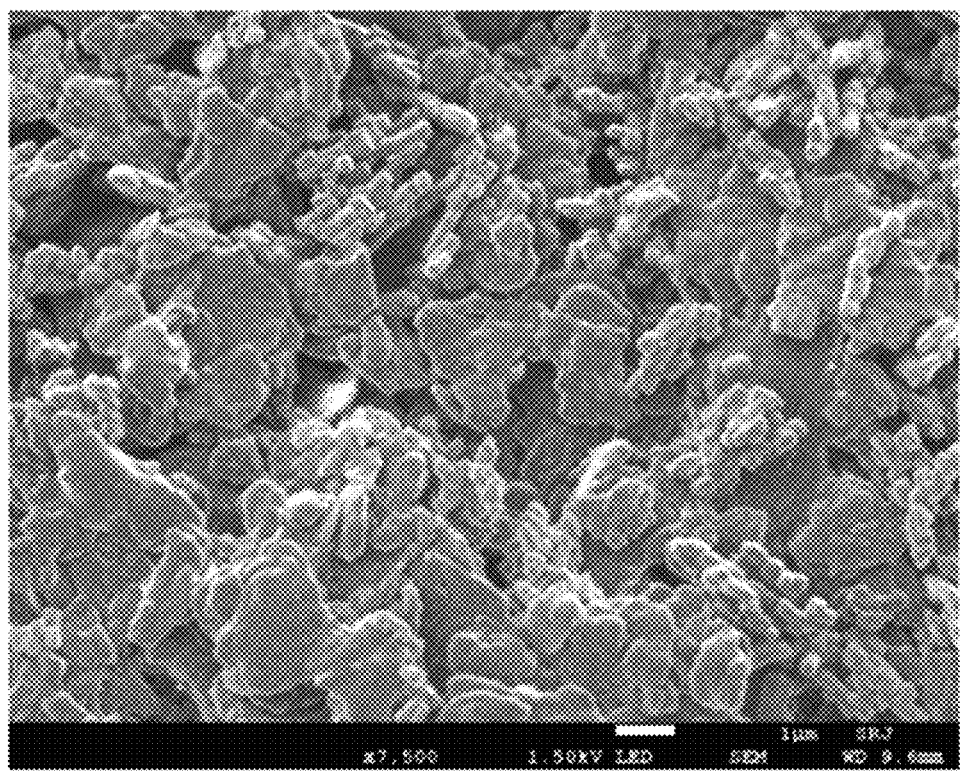
FIG. 3 is a SEM photograph of polyethylene particles of a negative electrode functional layer according to an embodiment.

The polyethylene particles according to this disclosure are flake-shaped, as seen in FIG. 3, and the average particle size may be defined as (D50) described above.

When the size and thickness of the flake-shaped polyethylene particles are within the above range, ion channels may be effectively closed even in a small amount of the flake-shaped polyethylene.

When the negative electrode functional layer including the flake-shaped polyethylene particles is provided, a reaction rate may be increased according to temperature under the same reaction conditions, compared with the case of including spherical polyethylene particles, thereby improving safety improvement effect of the rechargeable lithium battery. In the case of the flake-shaped polyethylene particles before melting, an area covering pores is thinner and wider than that of the spherical shape polyethylene particles before melting. When the polyethylene particles are melted at a predetermined temperature or more to close ion channels, a reaction rate is faster because the flake-shaped polyethylene particles have a larger area than that of the electrode plate closed by the melted spherical polyethylene particles.

That is, the polyethylene particles included in the negative electrode functional layer during thermal runaway of the battery is melted to close the ion channel, thereby limiting the movement of the ions to implement a shut-down function may prevent additional electrochemical reactions.

Figure 4:
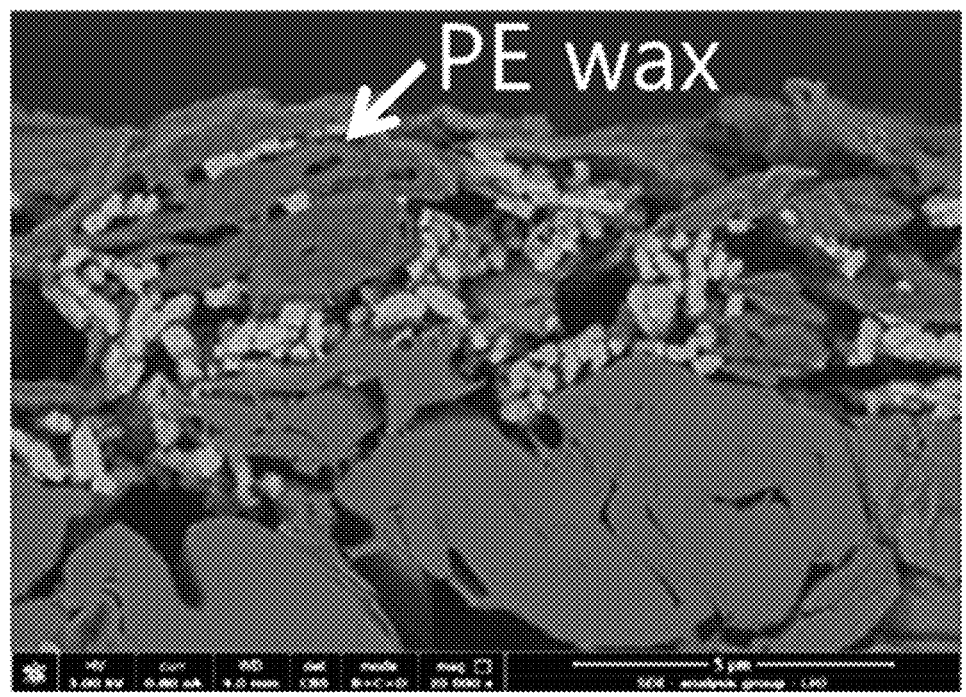
FIG. 4 is a SEM photograph of a negative electrode composition according to an embodiment.

For example, as shown in FIG. 4, since the flake-shaped polyethylene particles according to the embodiment are disposed in a thin and wide shape on the pores in a composition for the negative electrode functional layer, the flake-shaped polyethylene particles melts more rapidly during thermal runaway due to thermal/physical impact, thereby suppressing passage of ions.

The negative electrode functional layer may further include inorganic particles and a binder.

A sum amount of the flake-shaped polyethylene particles and the inorganic particles over an amount of the binder may be a weight ratio of about 80:20 through about 99:1, and specifically, a weight ratio of about 85:15 through about 97:3.

The flake-shaped polyethylene particles and the inorganic particles may be included in a weight ratio of about 95:5 through about 10:90, and specifically in a weight ratio of about 30:70 through about 70:30.

The amounts of the flake-shaped polyethylene particles and the inorganic particles within the above range, may secure cycle-life characteristics and output characteristics of a battery.

The inorganic particles may include, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but are not limited thereto. Organic particles such as an acrylic compound, an imide compound, an amide compound, or a combination thereof may be further included in addition to the inorganic particles, but are not limited thereto.

The inorganic particles may be spherical, flake-shaped, cubic, or amorphous. The inorganic particles may have an average particle diameter of about 1 nm to about 2500 nm, for example about 100 nm to about 2000 nm, about 200 nm to about 1000 nm, or about 300 nm to about 800 nm. The average particle diameter of the inorganic particle may be an average particle size ($D_{50}$) at a volume ratio of 50% in a cumulative size-distribution curve.

The negative electrode functional layer may have a thickness of about 1 μm to about 10 and specifically about 3 μm to about 10 μm.

In addition, a ratio of the thickness of the negative active material layer to the thickness of the negative electrode functional layer may be about 50:1 through about 10:1, and specifically about 30:1 through about 10:1.

The negative electrode functional layer with the thickness of within above-mentioned range, may significantly improve the thermal safety while maintaining excellent cycle-life characteristics.

In particular, when the ratio of the thickness of the negative electrode functional layer is included in the above range, thermal safety may be improved while minimizing the decrease in energy density.

The negative current collector may include one selected from a copper foil, a nickel foil, a stainless steel foil, a titanium foil, a nickel foam, a copper foam, a polymer substrate coated with a conductive metal, and a combination thereof.

The negative active material may include a material that reversibly intercalates/de-intercalates lithium ions, a lithium metal, a lithium metal alloy, a material capable of doping/de-doping lithium, or a transition metal oxide.

Examples of the material capable of reversibly intercalating/de-intercalating the lithium ions may include a carbonaceous material, that is, a carbon-based negative active material generally used in a rechargeable lithium battery. Examples of the carbon-based negative active material may be crystalline carbon, amorphous carbon, or a combination thereof. The crystalline carbon may be graphite such as non-shaped, sheet-shaped, flake-shaped, spherical shape, or fiber shaped natural graphite or artificial graphite, and the amorphous carbon may be a soft carbon, a hard carbon, a mesophase pitch carbonization product, fired coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/de-doping lithium may be a silicon-based or a tin-based material, for example, Si, $SiO_x$ ($0<x<2$), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, but not Si), a Si-carbon composite, Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, but not Sn), a Sn-carbon composite and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may include a lithium titanium oxide.

In the negative active material layer, an amount of the negative active material about 95 wt % to about 99 wt % based on a total weight of the negative active material layer.

The negative active material layer may optionally further include a negative electrode conductive material and a negative electrode binder.

Each amount of the negative electrode conductive material and negative electrode binder may be about 1 wt % to about 5 wt % based on a total weight of the negative active material layer.

The negative electrode conductive material is used to impart conductivity to the negative electrode, and types of the negative electrode conductive material is the same as types of the positive electrode conductive material described above.

The negative electrode binder improves binding properties of negative active material particles with one another and with a current collector. The negative electrode binder may be a non-water-soluble binder, a water-soluble binder, an amphiphilic binder (a water-soluble/non-water-soluble binder), or a combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

The amphiphilic binder may be an acrylated styrene-based rubber.

When the water-soluble binder is used as a negative electrode binder, a cellulose-based compound may be further used to provide viscosity as a thickener. The cellulose-based compound includes one or more of carboxylmethyl cellulose, hydroxypropylmethyl cellulose, methyl cellulose, or alkali metal salts thereof. The alkali metals may be Na, K, or Li. The thickener may be included in an amount of about 0.1 parts by weight to about 3 parts by weight based on 100 parts by weight of the negative active material.

The rechargeable lithium battery according to an embodiment of the present invention have the negative electrode functional layer including the flake-shaped polyethylene particles on the negative electrode and simultaneously, the positive active material layer including the lithium cobalt oxide (LCO)-based active material and the lithium manganese oxide (LMO)-based active material and thus may minimize the capacity degradation and simultaneously, lower the heat-increasing rate according to thermal/physical impacts and thus effectively exhibit a shut-down effect.

On the other hand, the separator 113 may be disposed between the positive electrode 111 and the negative electrode 112 as described above. The separator 113 may be, for example, selected from a glass fiber, polyester, polyethylene, polypropylene, polytetrafluoroethylene, or a combination thereof. It may have a form of a non-woven fabric or a woven fabric. For example, in a rechargeable lithium battery, a polyolefin-based polymer separator such as polyethylene and polypropylene is mainly used. In order to ensure the heat resistance or mechanical strength, a coated separator including a ceramic component or a polymer material may be used. Optionally, it may have a mono-layered or multi-layered structure.

Hereinafter, the above aspects of the present disclosure are illustrated in more detail with reference to examples. However, these examples are exemplary, and the present disclosure is not limited thereto.

Manufacture of Rechargeable Lithium Battery Cells

Example 1

96 wt % of a positive active material prepared by mixing LiCoO2/LiMn2O4 in a weight ratio of 95:5 as first/second positive active materials, 3 wt % of a polyvinylidene fluoride binder, and 1 wt % of a ketjen black conductive material were mixed in an N-methylpyrrolidone solvent to prepare positive active material slurry. The positive active material slurry was coated on both surfaces of an aluminum current collector and then, dried and compressed to manufacture a positive electrode having a positive active material layer.

98 wt % of graphite, 0.8 wt % of carboxylmethyl cellulose, and 1.2 wt % of a styrene-butadiene rubber were mixed in pure water to prepare negative active material slurry. The negative active material slurry was coated on both surfaces of a copper current collector and then, dried and compressed to manufacture a negative electrode having a negative active material layer.

48 wt % of flake-shaped 2 µm PE particles (a long axis length/a short axis length=about 2, a thickness=about 0.6 µm), 47 wt % of alumina (an average particle diameter (D50)=0.7 µm), and 5 wt % of an acylated styrene-based rubber binder were mixed in an alcohol-based solvent to prepare PE/alumina slurry.

The PE/alumina slurry was coated on both surface of the negative electrode and then, dried and compressed to manufacture a negative electrode having a coating layer and the flake-shaped PE particles.

The positive electrode, a separator formed of a PE/PP multi-layer, and the negative electrode including the coating layer including the flake-shaped PE particles were sequentially stacked to form an electrode assembly having a structure shown in FIG. 1, and an electrolyte (1.0 M LiPF6 in EC/DEC=50:50 v/v) was injected thereinto to manufacture a rechargeable battery cell.

Comparative Example and Examples 2 and 3

Rechargeable lithium battery cells were respectively manufactured according to the same method as Example 1 except that the cells were respectively manufactured to have structures shown in Table 1.

Example 4

LiCoO$_2$ as a first positive active material, polyvinylidene fluoride as a binder, and ketjen black as a conductive material in a weight ratio of 96:3:1 were dispersed in an N-methylpyrrolidone solvent to prepare positive active material slurry. The positive active material slurry was coated on both of the surface of an aluminum current collector and then, dried and compressed to form a positive active material layer.

In addition, in order to form a positive electrode functional layer, LiMn$_2$O$_4$ as a second positive active material and PVDF as a binder were dispersed in a weight ratio of 95:5 in an NMP solvent to prepare positive electrode functional layer slurry.

A rechargeable lithium battery cell was manufactured according to the same method as Example 1 except that the positive electrode functional layer slurry was loaded on the positive active material layer in an amount of 3 wt % based on a total weight of the positive active material and then, coated, dried, and compressed to form a positive electrode functional layer and thus manufacture a positive electrode.

The positive electrode finally included 99 wt % of LiCoO$_2$ and 1 wt % of LiMn$_2$O$_4$.

Examples 5 and 6

Rechargeable lithium battery cells were manufactured according to the same method as Example 4 except that the cells were respectively manufactured to have structures shown in Table 2.

Example 7

96 wt % of a positive active material prepared by mixing LiCoO$_2$/LiMn$_2$O$_4$ in a weight ratio of 94:5 as first/second positive active materials, 3 wt % of a polyvinylidene fluoride binder, and 1 wt % of a ketjen black conductive material were mixed in an N-methylpyrrolidone solvent to prepare positive active material slurry. The positive active material slurry was coated on both surfaces of an aluminum current collector and then, dried and compressed to manufacture a positive active material layer having a positive active material layer.

In addition, in order to form a positive electrode functional layer, LiMn$_2$O$_4$ as a second positive active material and PVDF as a binder were dispersed in a weight ratio of 95:5 in an NMP solvent to prepare positive electrode functional layer slurry.

A rechargeable lithium battery cell was manufactured according to the same method as Example 1 except that the positive electrode functional layer slurry was loaded in an amount of 1 wt % based on a total weight of the positive active material on the positive active material layer and then, coated, dried, and compressed to form a positive electrode functional layer and thus manufacture a positive electrode.

The positive electrode finally included 94 wt % of LiCoO$_2$ and 6 wt % of LiMn$_2$O$_4$.

Examples 8 and 9

Rechargeable lithium battery cells were manufactured according to the same method as Example 7 except that the cells were respectively manufactured to have structures shown in Table 3.

Evaluation Examples

1. Evaluation of Penetration Safety

The rechargeable lithium battery cells of Example 1 to 9 and comparative example were used to perform a penetration experiment at 5 mm/s by using a pin having a diameter of 2.5 mm at a voltage of 4.3 V, and the results are shown in Tables 1 through 3.

<Evaluation Criteria>

L1: No influence on appearance

L2: Scratches on appearance but no leakage

L3: Leakage

L4: Fire

L5: Explosion

2. Evaluation of Dropping Safety

The rechargeable lithium battery cells according to Examples 1 through 9 and comparative example were 18 times respectively dropped from 1.8 m high at 20° C.±5° C. When the battery cells were placed to have an impact on several places, the dropping test was three times performed with respect to a top end/a bottom end/a right top angle/a right bottom angle/a left top angle/a left bottom angle, and the results are shown in Tables 1 through 3.

3. Evaluation of Collision Safety

The rechargeable lithium battery cells according to Examples 1 through 9 and comparative example were charged at 0.5 C under a cut-off of 0.05 C up to a maximum voltage and aged for 24 hours and then, evaluated as follows:

A full-charged cell was put on a steel plate (a thickness≥5 cm).

A round bar (15 mm) was placed in the center of a specimen, wherein the round bar should be placed in a vertical direction with an electrode.

A cylindrical cell was evaluated by placing the round bar in the center like a seesaw shape.

A cylindrical weight of 9 kg was freely dropped from 610 mm high to the bar, and the results were examined and shown in Tables 1 through 3.

TABLE 1

| | Positive electrode composition (Mixture) | | | | |
| | 1$^{st}$ positive active material (wt %) | 2$^{nd}$ positive active material (wt %) | Penetration | Dropping | Collision |
| --- | --- | --- | --- | --- | --- |
| Ex. 1 | 95 | 5 | L4 | L4 | L4 |
| Ex. 2 | 90 | 10 | L2 | L2 | L2 |
| Ex. 3 | 85 | 15 | L2 | L2 | L2 |
| Comp. Ex. | 100 | 0 | L5 | L4 | L5 |

TABLE 2

| | Positive active material layer 1$^{st}$ positive active material (wt %) | Positive electrode functional layer 2$^{nd}$ positive active material (wt %) | Penetration | Dropping | Collision |
| --- | --- | --- | --- | --- | --- |
| Ex. 4 | 99 | 1 | L4 | L4 | L4 |
| Ex. 5 | 97 | 3 | L2 | L2 | L2 |
| Ex. 6 | 94 | 6 | L2 | L2 | L2 |
| Comp. Ex | 100 | 0 | L5 | L4 | L5 |

TABLE 3

| | Positive active material layer (Mixture) | | Positive electrode functional layer | | | |
|---|---|---|---|---|---|---|
| | 1st active material (wt %) | 2nd positive active material (wt %) | 2nd positive active material (wt %) | Penetration | Dropping | Collision |
| Ex. 7 | 94 | 5 | 1 | L2 | L2 | L2 |
| Ex. 8 | 92 | 5 | 3 | L2 | L2 | L2 |
| Ex. 9 | 89 | 5 | 6 | L2 | L2 | L2 |
| Ex. 1 | 95 | 5 | 0 | L4 | L4 | L4 |

In Tables 1 through 3, in the penetration, dropping, and collision safety evaluations, comparative example including no second positive active material was ignited or exploded, but most of the samples comprising the second positive active material according to various Examples exhibited no leakage and thus relatively sufficient penetration/dropping/collision safety characteristics.

Figure 2:
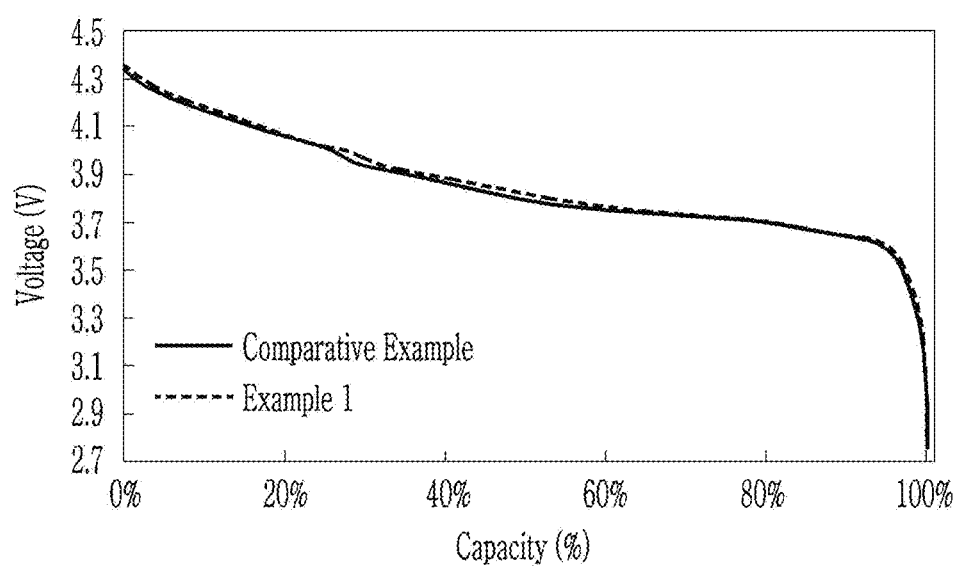
FIG. 2 is a graph showing discharge rate characteristics of the rechargeable battery cells according to Example 1 and comparative example.

FIG. 2 is a graph showing discharge rate characteristics of the rechargeable battery cells according to Example 1 and comparative example.

Referring to Tables 1 through 3 and FIG. 2, the rechargeable lithium battery cells of Examples simultaneously included the second positive active material and the first positive active material and exhibited improved safety without charge capacity degradation.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A rechargeable lithium battery, comprising:
a positive electrode comprising:
 a positive current collector; and
 a positive active material layer disposed on the positive current collector; and
a negative electrode comprising:
 a negative current collector;
 a negative active material layer disposed on the negative current collector; and
 a negative electrode functional layer disposed on the negative active material layer,
wherein the negative electrode functional layer comprises:
 flake-shaped polyethylene particles, and
wherein the positive active material layer comprises:
 a first positive active material including at least one of a composite oxide of metal selected from cobalt, manganese, nickel, and a combination thereof and lithium; and
 a second positive active material including at least one of compounds represented by Chemical Formula 1 through Chemical Formula 4, $$Li_{x2}Mn_{1-y2}M'_{y2}A_2 \quad \text{[Chemical Formula 1]}$$

$$Li_{x2}Mn_{1-y2}M'_{y2}O_{2-z2}X_{z2} \quad \text{[Chemical Formula 2]}$$

$$Li_{x2}Mn_2O_{4-z2}X_{z2} \quad \text{[Chemical Formula 3]}$$

$$Li_{x2}Mn_{2-y2}M'_{y2}M''_{z2}A_4 \quad \text{[Chemical Formula 4]}$$

wherein in Chemical Formula 1 through Chemical Formula 4, $0.9 \leq x2 \leq 1.1$, $0 \leq y2 \leq 0.5$, $0 \leq z2 \leq 0.5$, M' and M" are the same or different and are selected from Mg, Al, Co, K, Na, Ca, Si, Ti, Sn, V, Ge, Ga, B, As, Zr, Mn, Cr, Fe, Sr, V, and a rare earth element, and A is selected from O, F, S, and P and X is selected from F, S, and P, wherein the positive active material layer further comprises a positive electrode functional layer disposed on the positive active material layer, wherein the first positive active material is included in the positive active material layer, and wherein the second positive active material is included in the positive electrode functional layer.

2. The rechargeable lithium battery of claim 1, wherein the second positive active material has an average potential of about 3.5 V to about 4.5 V.

3. The rechargeable lithium battery of claim 1, wherein the first positive active material is included in an amount of about 80 wt % to about 99 wt % based on a total weight of the positive active material layer.

4. The rechargeable lithium battery of claim 1, wherein the first positive active material and the second positive active material are included in a weight ratio of about 85:15 to about 99:1.

5. The rechargeable lithium battery of claim 1, wherein the first positive active material and the second positive active material are included in a weight ratio of about 85:15 to about 99:1.

6. A rechargeable lithium battery comprising:
a positive electrode comprising:
 a positive current collector; and
 a positive active material layer disposed on the positive current collector; and
a negative electrode comprising:
 a negative current collector;
 a negative active material layer disposed on the negative current collector; and
 a negative electrode functional layer disposed on the negative active material layer,
wherein the negative electrode functional layer comprises:
 flake-shaped polyethylene particles, and
wherein the positive active material layer comprises:
 a first positive active material including at least one of a composite oxide of metal selected from cobalt, manganese, nickel, and a combination thereof and lithium; and
 a second positive active material including at least one of compounds represented by Chemical Formula 1 through Chemical Formula 4, $$Li_{x2}Mn_{1-y2}M'_{y2}A_2 \quad \text{[Chemical Formula 1]}$$

$$Li_{x2}Mn_{1-y2}M'_{y2}O_{2-z2}X_{z2} \quad \text{[Chemical Formula 2]}$$

$$Li_{x2}Mn_2O_{4-z2}X_{z2} \quad \text{[Chemical Formula 3]}$$

$$Li_{x2}Mn_{2-y2}M'_{y2}M''_{z2}A_4 \quad \text{[Chemical Formula 4]}$$

wherein in Chemical Formula 1 through Chemical Formula 4, $0.9 \leq x2 \leq 1.1$, $0 \leq y2 \leq 0.5$, $0 \leq z2 \leq 0.5$, M' and M" are the same or different and are selected from Mg, Al, Co, K, Na, Ca, Si, Ti, Sn, V, Ge, Ga, B, As, Zr, Mn, Cr, Fe, Sr, V, and a rare earth element, and A is selected from O, F, S, and P and X is selected from F, S, and P, wherein the first positive active material is included in the positive active material layer, and wherein the second positive active material is included in the positive active material layer and the positive electrode functional layer, respectively.

7. The rechargeable lithium battery of claim 6, wherein the first positive active material and the second positive active material are included in a weight ratio of about 85:15 to about 99:1.

8. The rechargeable lithium battery of claim 6, wherein the second positive active material of the positive electrode functional layer is included in an amount of about 20 parts by weight to about 120 parts by weight based on 100 parts by weight of the second positive active material of the positive active material layer.

9. The rechargeable lithium battery of claim 1, wherein the first positive active material comprises one of $LiCoO_2$, $Li_{x1}M^1_{1-y1-z1}M^2_{y1}M^3_{z1}O_2$ ($0.9 \leq x1 \leq 1.8$, $0 \leq y1 \leq 1$, $0 \leq z1 \leq 1$, $0 \leq y1+z1 \leq 1$, and $M^1$, $M^2$, and $M^3$ are independently a metal of Ni, Co, Mn, Al, Sr, Mg, or La), and a combination thereof.

10. The rechargeable lithium battery of claim 1, wherein the second positive active material comprises $LiMn_2O_4$.

11. The rechargeable lithium battery of claim 1, wherein the flake-shaped polyethylene particles has an average particle size (D50) of about 1 μm to about 8 μm.

12. The rechargeable lithium battery of claim 1, wherein a ratio of a long axis length relative to a short axis length of the flake-shaped polyethylene particles is about 1 to about 5.

13. The rechargeable lithium battery of claim 1, wherein a thickness of the flake-shaped polyethylene particles is about 0.2 μm to about 4 μm.

14. The rechargeable lithium battery of claim 1, wherein the negative electrode functional layer further comprises:

inorganic particles; and a binder.

15. The rechargeable lithium battery of claim 14, wherein a sum amount of the flake-shaped polyethylene particles and the inorganic particles over an amount of the binder is a weight ratio of about 80:20 to about 99:1.

16. The rechargeable lithium battery of claim 14, wherein the flake-shaped polyethylene particles and the inorganic particles are included in a weight ratio of about 95:5 to about 10:90.

17. The rechargeable lithium battery of claim 1, wherein the negative electrode functional layer is about 1 μm to about 10 μm thick.

* * * * *